(12) United States Patent
Hua et al.

(10) Patent No.: US 11,849,388 B2
(45) Date of Patent: Dec. 19, 2023

(54) METHOD AND SYSTEM FOR APPLICATION EXPOSURE AND NETWORK SLICE SELECTION BASED ON REGISTRATION AREA

(71) Applicant: Verizon Patent and Licensing Inc., Basking Ridge, NJ (US)

(72) Inventors: Suzann Hua, Beverly Hills, CA (US); Sudhakar Reddy Patil, Flower Mound, TX (US); Ye Huang, San Ramon, CA (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 209 days.

(21) Appl. No.: 17/242,431

(22) Filed: Apr. 28, 2021

(65) Prior Publication Data
US 2022/0353800 A1 Nov. 3, 2022

(51) Int. Cl.
*H04W 48/18* (2009.01)
*H04W 64/00* (2009.01)
*H04W 48/16* (2009.01)
*H04W 16/02* (2009.01)

(52) U.S. Cl.
CPC .......... *H04W 48/18* (2013.01); *H04W 48/16* (2013.01); *H04W 64/00* (2013.01); *H04W 16/02* (2013.01)

(58) Field of Classification Search
CPC ..... H04W 48/16; H04W 48/18; H04W 16/02; H04W 64/00
See application file for complete search history.

(56) References Cited

U.S. PATENT DOCUMENTS

| 9,888,455 | B1* | 2/2018 | Laslo-Amit | B61L 25/02 |
| 2017/0374492 | A1* | 12/2017 | Lu | H04W 8/08 |
| 2018/0242224 | A1* | 8/2018 | Pinheiro | H04W 48/08 |
| 2018/0317163 | A1* | 11/2018 | Lee | H04W 48/18 |
| 2021/0153077 | A1* | 5/2021 | Samdanis | H04W 48/18 |
| 2021/0306806 | A1* | 9/2021 | Dang | H04W 76/11 |
| 2022/0322221 | A1* | 10/2022 | Ianev | H04W 48/18 |
| 2022/0322222 | A1* | 10/2022 | Shin | H04W 36/0022 |

* cited by examiner

*Primary Examiner* — Steven S Kelley

(57) ABSTRACT

A method, a device, and a non-transitory storage medium are described in which a registration area-based application exposure and network slice selection service is provided. The service may include the generation of multiple sets of allowed network slices based on a type of end device, current tracking area, and registration area information. The service may also include selecting one of the sets of allowed network slices based on a mobility pattern of the end device. The service may also translate allowed network slices, current tracking area and registration area information, and expose the translated information to an application function.

20 Claims, 18 Drawing Sheets

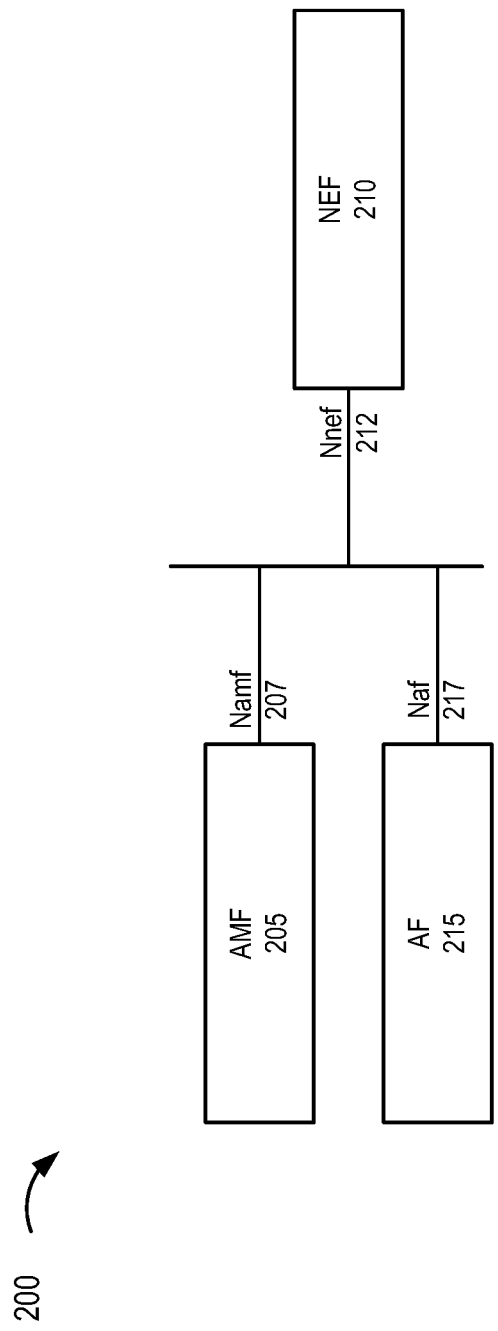

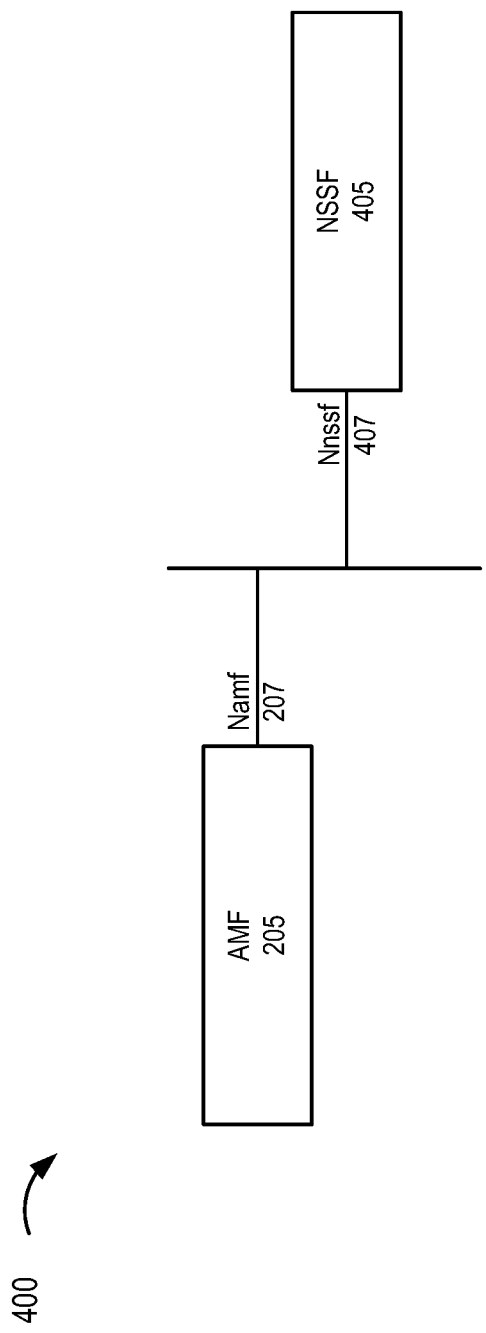

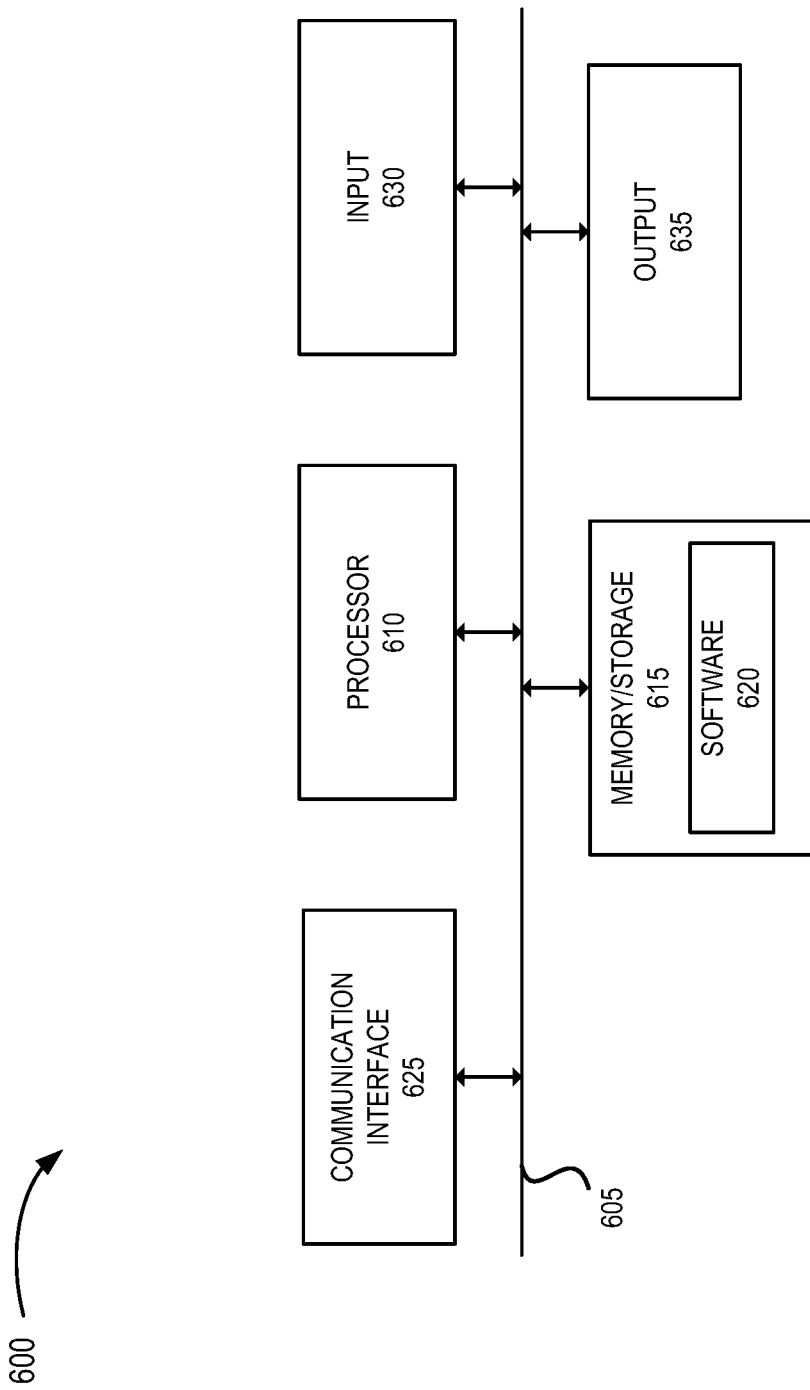

METHOD AND SYSTEM FOR APPLICATION EXPOSURE AND NETWORK SLICE SELECTION BASED ON REGISTRATION AREA

BACKGROUND

Development and design of networks present certain challenges from a network-side perspective and an end device perspective. For example, Next Generation (NG) wireless networks, such as Fifth Generation New Radio (5G NR) networks are under development. Among other things, the development and design of a 5G NR network may include increasing data transfer rates, increasing spectral efficiency, improving coverage, reducing latency and enhancing end user application services for end devices.

BRIEF DESCRIPTION OF THE DRAWINGS

FIG. 2 is a diagram illustrating another exemplary environment in which an exemplary embodiment of the registration area-based application exposure and network slice selection service may be implemented;

FIG. 4 is a diagram illustrating yet another exemplary environment in which an exemplary embodiment of the registration area-based application exposure and network slice selection service may be implemented;

FIG. 6 is a diagram illustrating exemplary components of a device that may correspond to one or more of the devices illustrated and described herein;

DETAILED DESCRIPTION

Figure 1:
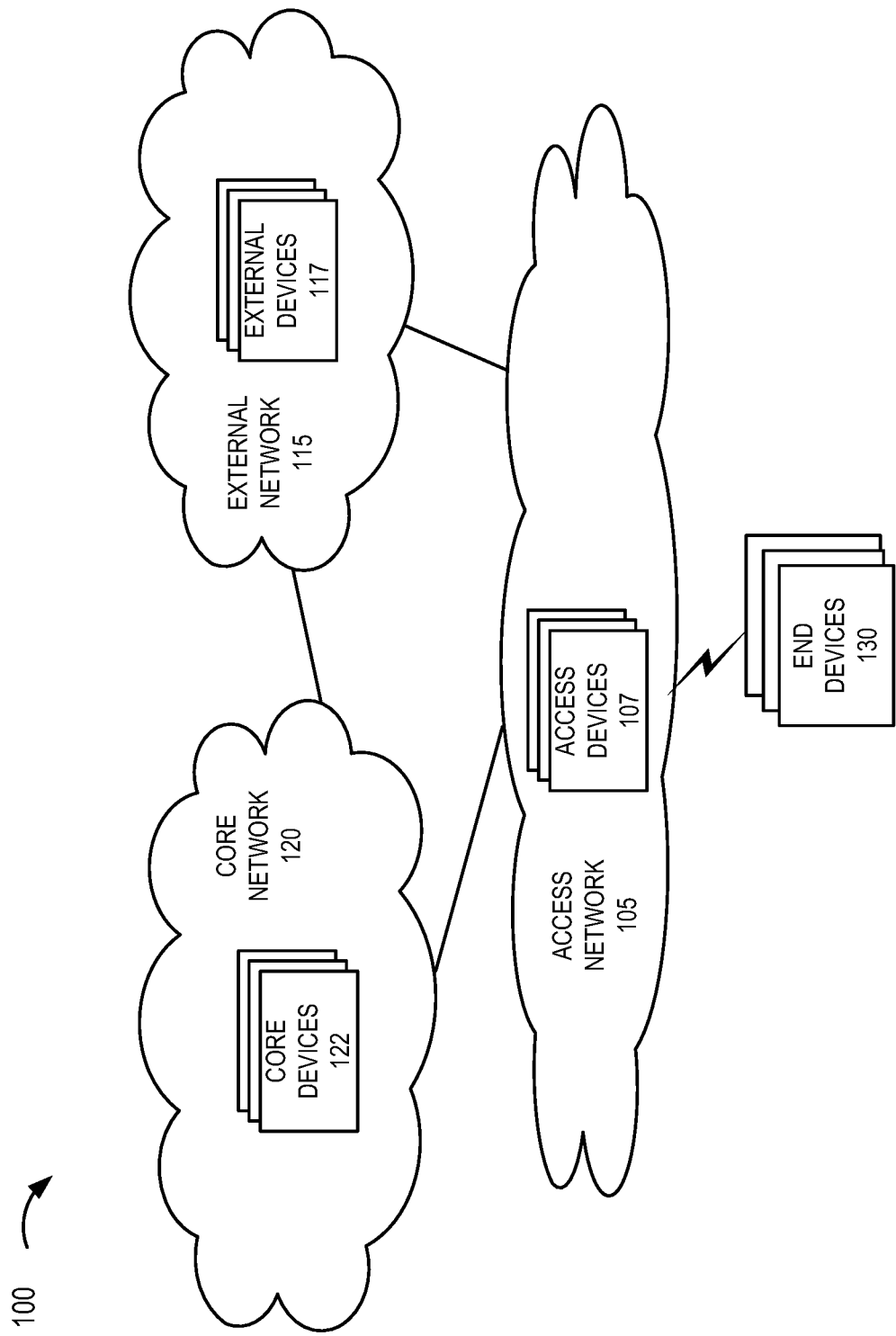
FIG. 1 is a diagram illustrating an exemplary environment in which an exemplary embodiment of a registration area-based application exposure and network selection service may be implemented.

The following detailed description refers to the accompanying drawings. The same reference numbers in different drawings may identify the same or similar elements. Also, the following detailed description does not limit the invention.

As a part of the development of 5G NR networks, network operators and standardizing entities (e.g., Third Generation Partnership Project (3GPP), 3GPP2, International Telecommunication Union (ITU), European Telecommunications Standards Institute (ETSI), GSM Association (GSMA), etc.), for example, are exploring various network parameters to implement. One such network parameter is a "registration area" parameter. The registration area parameter may indicate a set of tracking areas (TAs) that may reflect the mobility pattern of an end device. The communication of the registration area parameter among various network devices in a 5G radio access network (RAN) and/or a 5G core network, for example, and the use of the registration area parameter by such network devices has yet to be fully realized.

According to exemplary embodiments, a registration area-based application exposure and network selection service is described. According to an exemplary embodiment, the registration area-based application exposure and network selection service may be implemented by network devices of a 5G core network or a future generation core network, as described herein.

According to an exemplary embodiment, the registration area-based application exposure and network selection service may use tracking area information or registration area information in relation to allowed network slices for an end device based on the type of end device. For example, the type of end device may be implemented as a mobile end device or a stationary end device. According to an exemplary embodiment, the registration area-based application exposure and network selection service may translate tracking area information or the registration area information into map information, as described herein. According to an exemplary embodiment, the registration area-based application exposure and network selection service may translate the allowed network slices to allowed application function (AF) information and may provide the map information and allowed AFs to a requesting AF, as described herein.

According to an exemplary embodiment, the registration area-based application exposure and network selection service may also generate multiple instances of allowed network slices for the end device based on the tracking area information and the registration area information, as described herein. According to an exemplary embodiment, the registration area-based application exposure and network selection service may also generate multiple instances of candidate devices that may support the multiple instances of allowed network slices. According to an exemplary embodiment, the registration area-based application exposure and network selection service may select one of the multiple instances of allowed network slices based on the mobility pattern of the end device, as described herein.

In view of the foregoing, the registration area-based application exposure and network slice selection service may enhance the use of the registration area parameter among network devices of a core network and improve the provisioning of network slices to end devices and other network services. The concept of the registration area may reduce end device registration updates while the end device moves around within a registration area. This may reduce signaling traffic between a RAN and a core network. Additionally, for example, this may enable a wireless station of the RAN (e.g., next generation Node B (gNB)) to page the end device more efficiently.

FIG. 1 is a diagram illustrating an exemplary environment 100 in which an exemplary embodiment of registration area-based application exposure and network slice selection service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. Additionally, an interface of a network device may be modified (e.g., relative to an interface defined by a standards body, such as 3GPP, 3GPP2, ITU, ETSI, GSMA, or the like) or a new interface of the network device may be provided in order to support the communication (e.g., transmission and reception of messages, information elements (IE), attribute value pairs (AVPs), objects, parameters, or other form of information) between network devices and the registration area-based application exposure and network selection service logic of the network device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN). Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone (NSA) new radio (NR), stand-alone (SA) NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, higher than mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, 5G and 6G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (MC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application layer network, a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/ photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), a service capability exposure function (SCEF) with a NEF (SCEF+NEF), and/or other combined nodes (e.g., an HSS with a UDM and/or UDR, an MME with an AMF, etc.).

According to an exemplary embodiment, at least a portion of core devices 122 may include registration area-based application exposure and network slice selection service logic and an interface that supports the registration area-based application exposure and network slice selection service, as described herein. According to some exemplary embodiments, other network devices of other types of networks (e.g., access network 105, external network 115, an X-haul network, or another type of network) may include registration area-based application exposure and network slice selection service logic and an interface that supports the registration area-based application exposure and network slice selection service, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

FIG. 2 is a diagram illustrating an exemplary environment 200 in which an exemplary embodiment of registration area-based application exposure and network slice selection service may be implemented. As illustrated, environment 200 may include an AMF 205, an NEF 210, and an AF 215. AMF 205, NEF 210, and AF 215 may be included in an exemplary embodiment of core network 120. Additionally, AMF 205 may communicate via an Namf 207 interface, NEF 210 may communicate via an Nnef 212 interface, and AF 215 may communicate via a Naf 217 interface, for example. While Namf, Nnef, and Naf interfaces may align with nomenclature of a 3GPP service-based architecture in a control plane of a 5G core network, for example, the registration area-based application exposure and network selection service, as described herein, is not limited to such nomenclature and/or functionality. Additionally, according to some exemplary embodiments, Namf 207, Nnef 212, and/or Naf 217 may operate according to some or all of the configurations and/or functionality defined by a standard (e.g., a 3GPP standard for a Namf interface, a 3GPP standard for an Nnef interface, a standard for a Naf interface associated with a standardizing body other than 3GGP, and so forth), Namf 207, Nnef 212, and/or Naf 217 may additionally operate according to an exemplary embodiment of registration area-based application exposure and network selection service, which has not been defined by any standard, for example. Furthermore, the interfaces of AMF 205, NEF 210, and AF 215 according to various exemplary embodiments, are not limited to service-based interfaces, as mentioned above. For example, NEF 210 and AF 215 may be implemented to include an N33 interface that supports an embodiment of the registration area-based application exposure and network slice service.

FIGS. 3A-3H are diagrams illustrating an exemplary process 300 of an exemplary embodiment of a registration area-based application exposure and network slice service. According to an embodiment of process 300, assume that a policy or rule (e.g., a UE Route and Selection Policy (URSP)) may associate a network slice with an AF or similarly functioning core device 122.

Figure 3A:
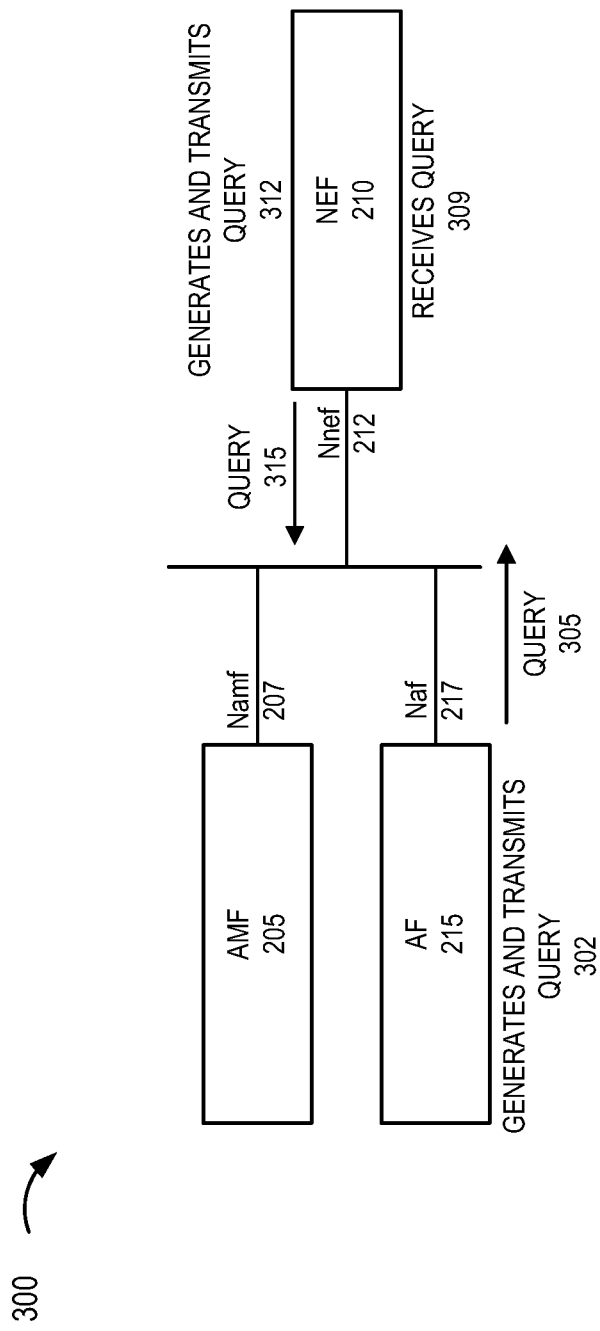
FIGS. 3A-3H are diagrams illustrating an exemplary process of an exemplary embodiment of the registration area-based application exposure and network slice selection service.

Referring to FIG. 3A, AF 215 may generate and transmit a query 302 to NEF 210. For example, a query 305 may include an external identifier for end device 130 and a request for the current registration information and allowed application(s) for end device 130. The external identifier may include a user and/or end device name, a domain, a network address (e.g., an (external) Internet Protocol (IP) address, etc.), and/or other information indicative of a unique identifier pertaining to end device 130. NEF 210 may receive the query 309, and in response, generate and transmit a query 312 to a UDM (not illustrated) or similar network device (e.g., UDR, an Equipment Identity Register (EIR), or the like). A query 315 may include a request for an identifier of end device 130 (e.g., a subscriber permanent identifier (SUPI) or another unique internal identifier of core network 120 and access network 105). Query 315 may include a request for a network address of an AMF 205 serving end device 130. Query 315 may include a request indicating whether end device 130 is a mobile end device or a stationary end device. For example, the UDM, the UDR, the EIR, or the like may store subscription and/or end device profile information that may include information that categorizes end device 130 as a stationary end device or a mobile end device, for example.

According to various exemplary embodiments, query 315 may include a request that queries other attributes or end device profile information associated with end device 130, such as power saving mode features (e.g., discontinuous reception (DRX) configuration, etc.), historical application traffic profile information (e.g., intermittent traffic, continuous traffic, bursty traffic, off-peak time traffic, infrequent traffic, etc.), and/or other characteristics of relevance associated with end device 130.

Figure 3B:
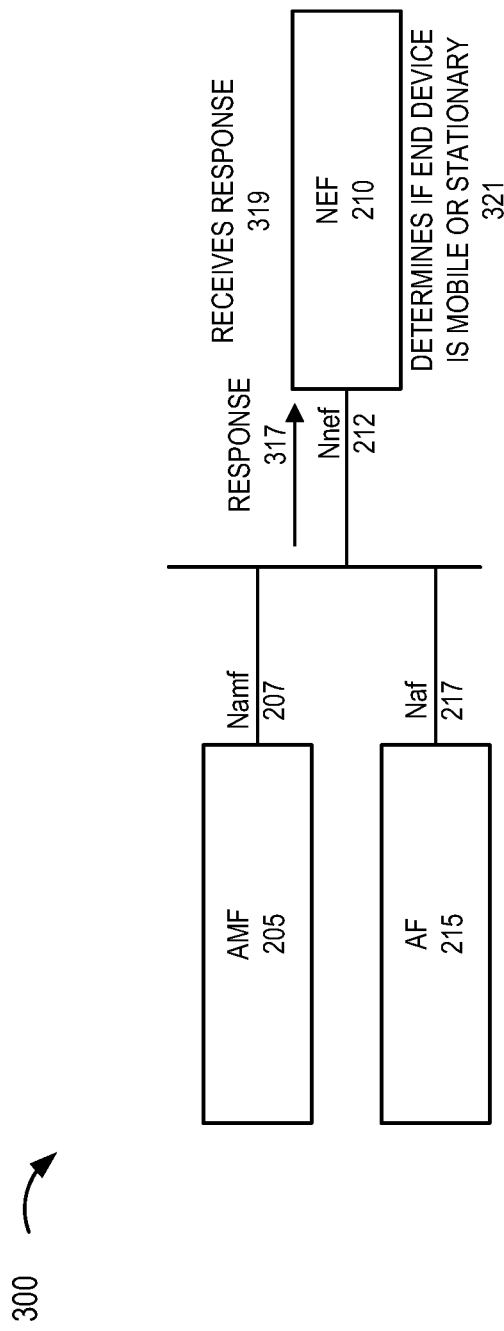
Figure 3C:
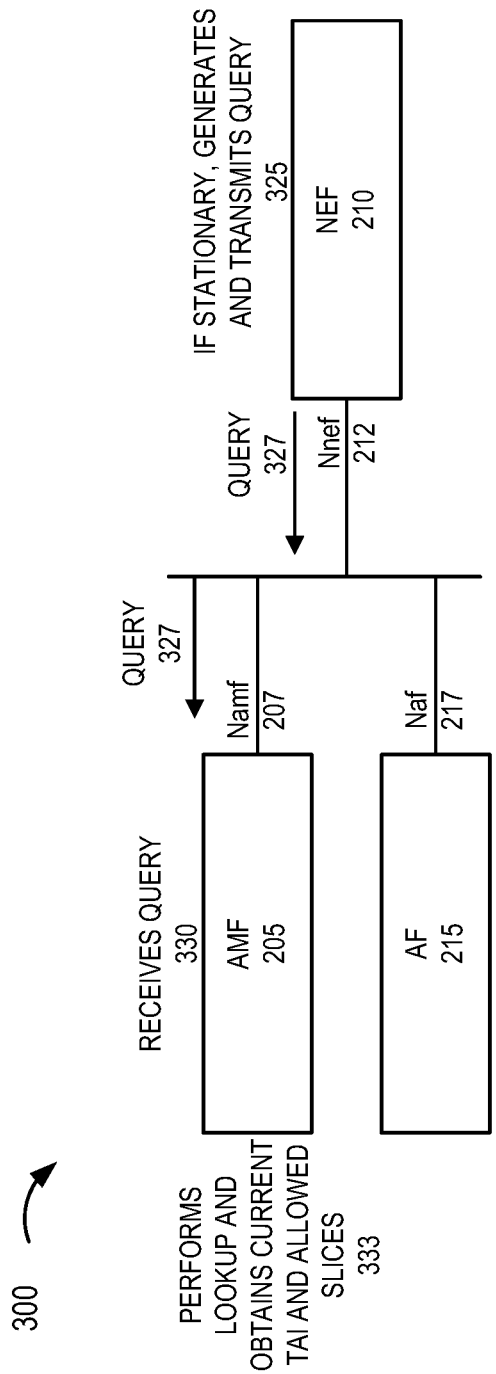

Referring to FIG. 3B, a response 317 may be transmitted to NEF 210 (e.g., by the UDM) and NEF 210 may receive a response 319 to query 315. Based on the receipt of response 317, NEF 210 may determine whether end device 130 is a stationary device or a mobile device 321. For example, a mobile device may be a smartphone or an end device in a motor vehicle. According to another example, a stationary device may be an IoT device attached to a pole or another type of end device that remains in a fixed location. Referring to FIG. 3C, when a stationary device, for example, NEF 210 may generate and transmit a query 325. For example, a query 327 may include a request for a current tracking area identity (TAI) (also known as TA identifier (TAI)) pertaining to end device 130 and an allowed set of network slices for end device 130. Query 327 may also include a unique identifier of end device 130, such as the SUPI or another suitable identifier for end device 130. NEF 210 may transmit query 327 to AMF 205 that may correspond to the queried address of the AMF serving end device 130. AMF 205 may receive the query 330. AMF 205 may perform a lookup and obtain the current TAI and the allowed set of network slices 333.

Figure 3D:
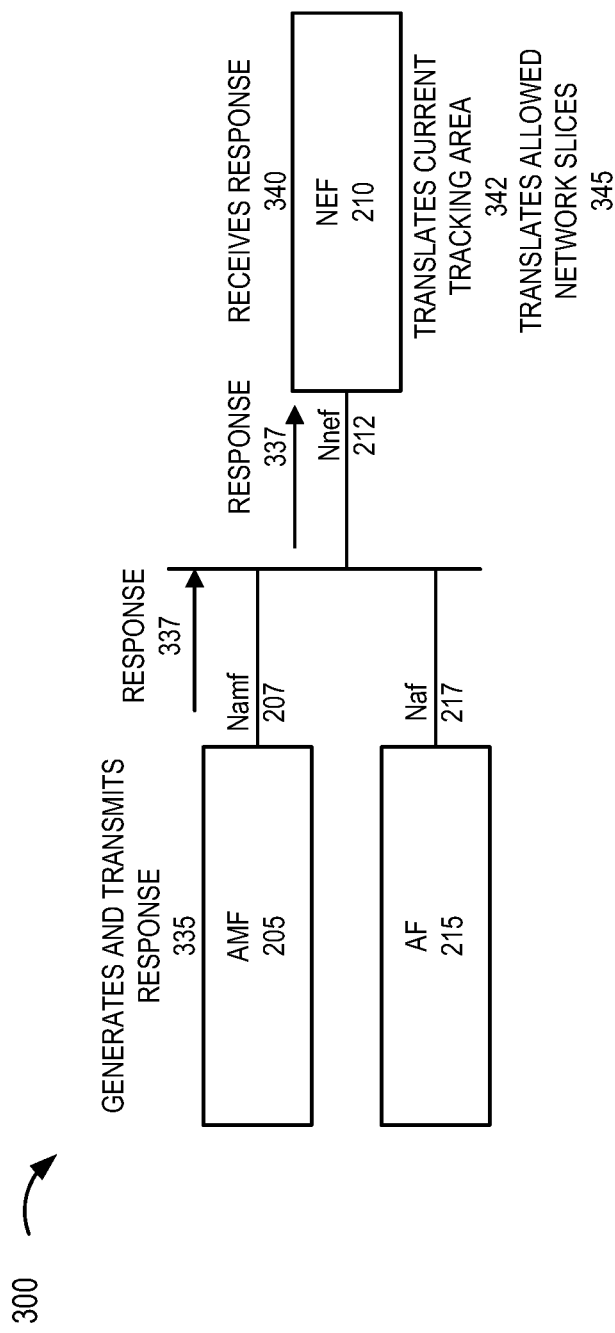

Referring to FIG. 3D, AMF 205 may generate and transmit a response 335. For example, a response 337 may include the current TAI, the allowed set of network slices, and the identifier of end device 130. NEF 210 may receive the response 340. Based on the received response, NEF 210 may translate the current tracking area 342 and may translate the allowed network slices 345. According to an exemplary embodiment, NEF 210 may translate the current TAI to a geographic map or area representation information. For example, the geographic map or area representation information may be implemented as one or multiple streets, one or multiple city blocks, a zip code, a city, a town, a county, a street address, a neighborhood, a landmark, a district, and/or another type of geographic region that may represent a current registration area for end device 130. According to an exemplary embodiment, NEF 210 may translate the allowed network slices to an allowed AF (e.g., one or multiple AFs 215).

Figure 3E:
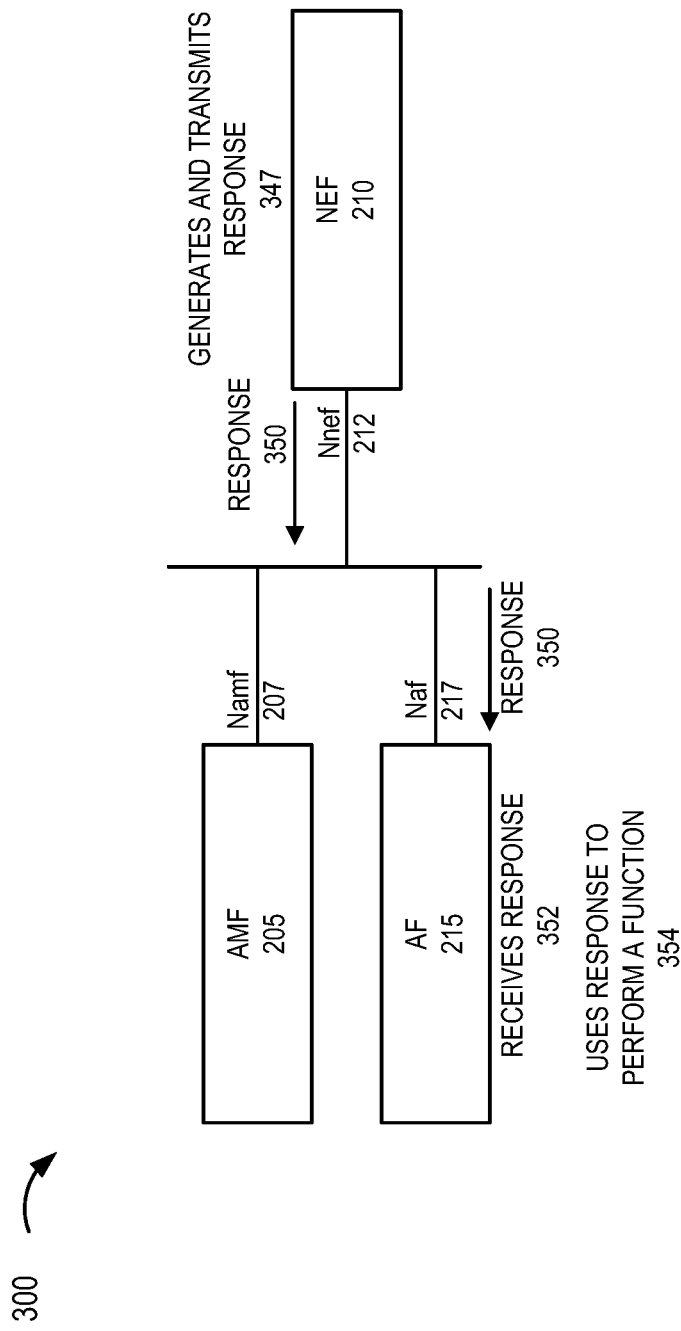

Referring to FIG. 3E, NEF 210 may generate and transmit a response 347. For example, a response 350 may include the current registration area information and allowed AFs. AF 215 may receive the response 352. AF 215 may use the response information to perform a function 354. For example, AF 215 may use the current registration area information and/or the allowed AFs to make a traffic routing decision, to prepare and/or invoke a migration procedure pertaining to end device 130, and/or another process or function associated with the capabilities of AF 215.

Figure 3F:
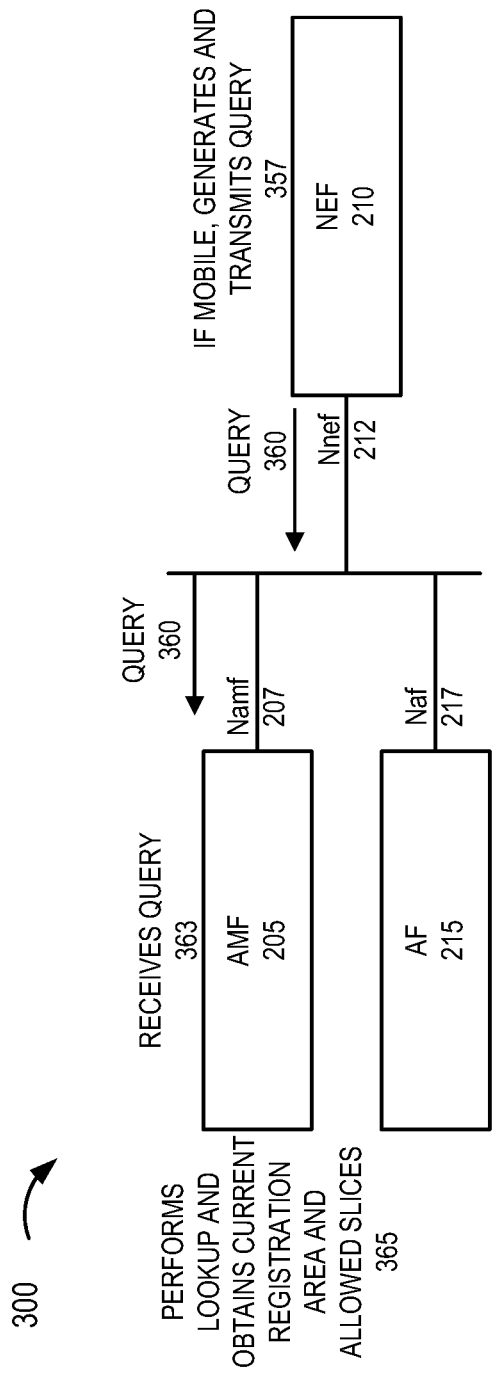

Referring to FIG. 3F (and FIG. 3B), NEF 210 may determine end device 130 is a mobile device, and NEF 210 may generate and transmit a query 357. For example, a query 360 may include a request for a current registration area pertaining to end device 130 and an allowed set of network slices for end device 130. The registration area may be implemented as a set of TAIs or TAs (e.g., multiple TAIs or TAs). Query 360 may also include a unique identifier of end device 130, such as the SUPI or another suitable identifier for end device 130. NEF 210 may transmit query 360 to AMF 205 that may correspond to the queried address of the AMF serving end device 130. AMF 205 may receive the query 363. AMF 205 may perform a lookup and obtain the current registration area and the allowed set of network slices 365.

Figure 3G:
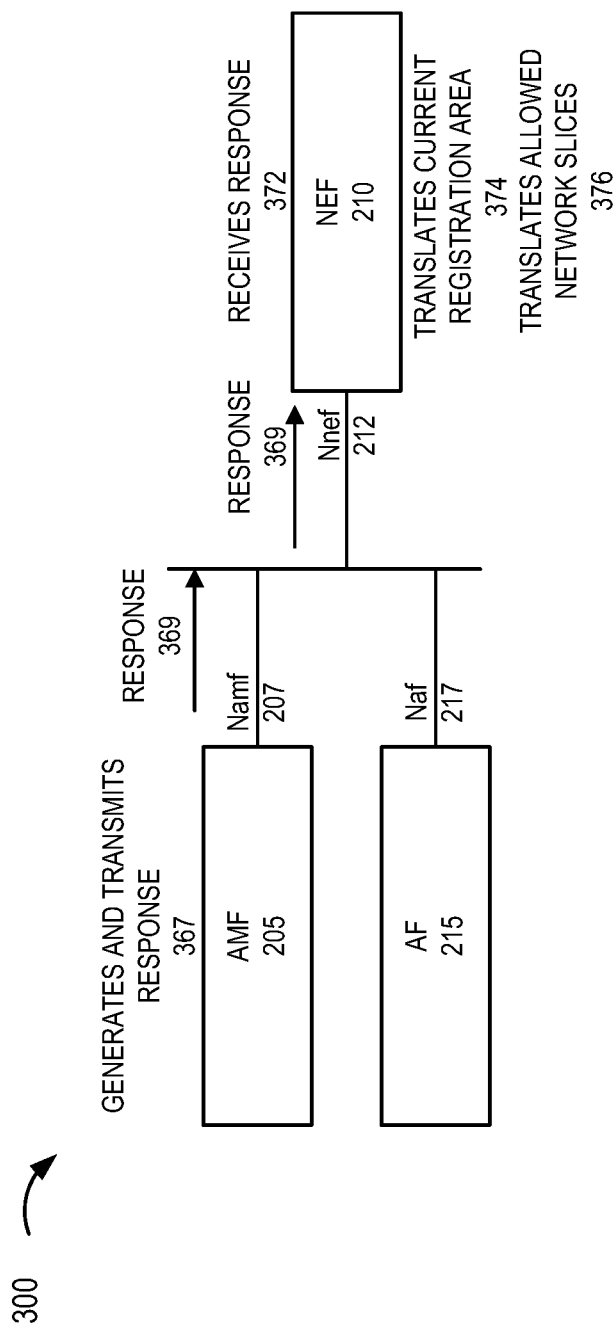

Referring to FIG. 3G, AMF 205 may generate and transmit a response 367. For example, a response 369 may include the current registration area (e.g., a list of TAs), the allowed set of network slices, and the identifier of end device 130. NEF 210 may receive the response 372. Based on the received response, NEF 210 may translate the current registration area 374 and may translate the allowed network slices 376. According to an exemplary embodiment, NEF 210 may translate the current registration area to a geographic map or area representation information. For example, the geographic map or area representation information may be implemented as one or multiple streets, one or multiple city blocks, a zip code, a city, a district, a landmark, a town, a county, and/or another type of geographic region that may represent a current registration area for end device 130. According to an exemplary embodiment, NEF 210 may translate the allowed network slices to an allowed AF (e.g., one or multiple AFs 215).

Figure 3H:
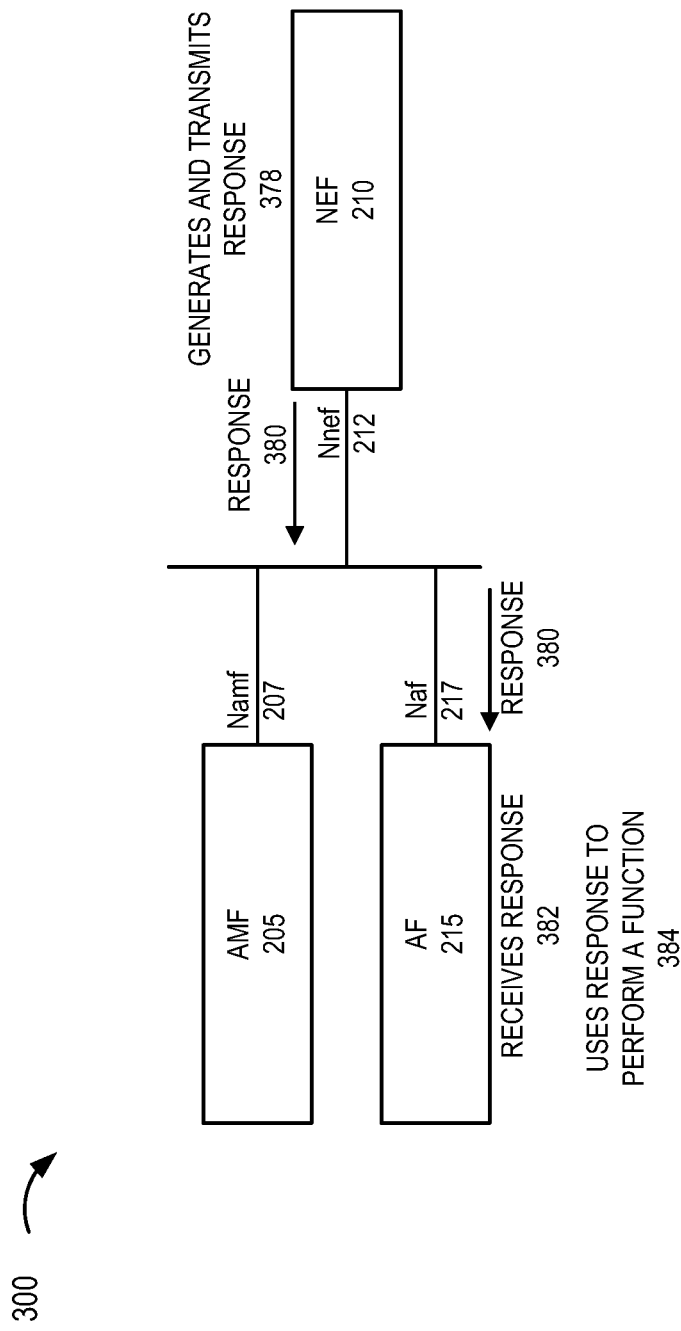

Referring to FIG. 3H, NEF 210 may generate and transmit a response 378. For example, a response 380 may include the current registration area information and allowed AFs. Response 380 may include the external identifier of end device 130. AF 215 may receive the response 382. AF 215 may use the response information to perform a function 384. For example, AF 215 may use the current registration area information and/or the allowed AFs to make a traffic routing decision, to prepare and/or invoke a migration procedure pertaining to end device 130, and/or another process or function associated with the capabilities of AF 215.

FIG. 4 is a diagram illustrating an exemplary environment 400 in which an exemplary embodiment of registration area-based application exposure and network slice selection service may be implemented. As illustrated, environment 400 may include AMF 205 and an NSSF 405. AMF 205 and NSSF 405 may be included in an exemplary embodiment of core network 120. Additionally, AMF 205 may communicate via Namf 207 interface and NSSF 405 may communicate via an Nnssf 407 interface, for example. While Namf and Nnssf interfaces may align with nomenclature of a 3GPP service-based architecture in a control plane of a 5G core network, for example, the registration area-based application exposure and network selection service, as described herein, is not limited to such nomenclature and/or functionality. Additionally, according to some exemplary embodiments, Namf 207 and/or Nnssf 407 may operate according to some or all of the configurations and/or functionality defined by a standard (e.g., a 3GPP standard for a Namf interface, a 3GPP standard for an Nnssf interface, a standard for an Nnssf interface associated with a standardizing body other than 3GGP, and so forth), Namf 207 and/or Nnssf 407 may additionally operate according to an exemplary embodiment of registration area-based application exposure and network selection service, which has not been defined by any standard, for example. Furthermore, the interfaces of AMF 205 and NSSF 405 according to various exemplary embodiments, are not limited to service-based interfaces, as mentioned above. For example, AMF 205 and NSSF 405 may be implemented to include an N22 interface that supports an embodiment of the registration area-based application exposure and network slice service.

FIGS. 5A-5D are diagrams illustrating an exemplary process 500 of an exemplary embodiment of a registration area-based application exposure and network slice service. According to an exemplary embodiment, process 500 may be performed as a part of an attachment procedure or a registration procedure associated with core network 120 and end device 130. According to other exemplary embodiments, process 500 may be performed as a part of another type of network procedure.

Figure 5A:
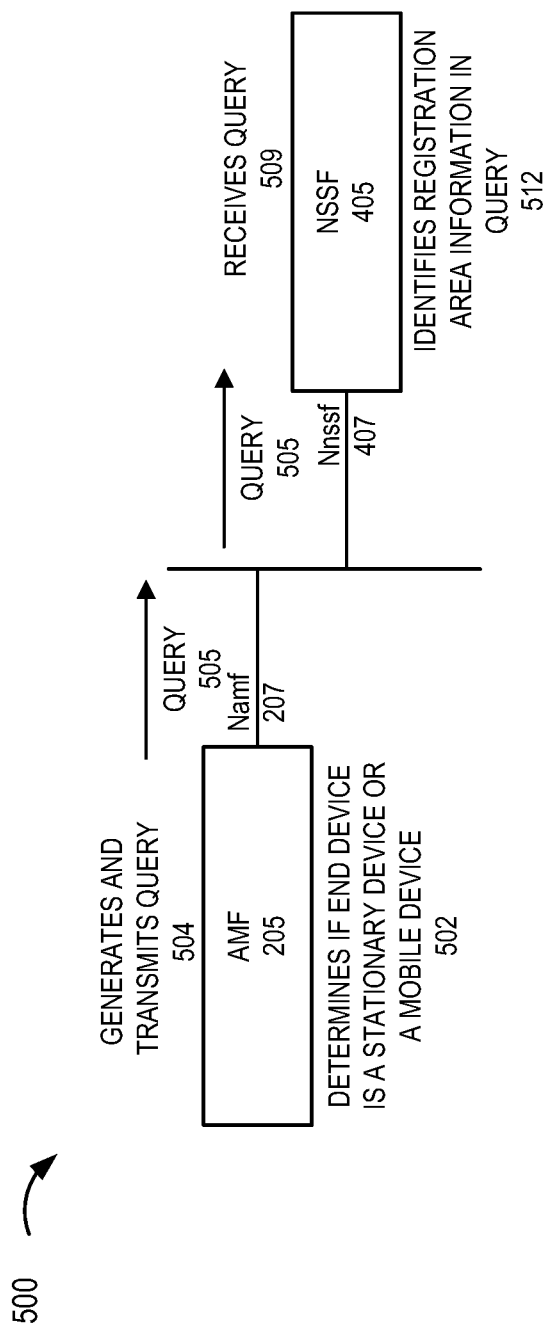
FIGS. 5A-5D are diagrams illustrating another exemplary process of an exemplary embodiment of the registration area-based application exposure and network slice selection service.

Referring to FIG. 5A, AMF 205 may determine if end device 130 is a stationary device or a mobile device 502. For example, AMF 205 may make this determination based on subscription information and/or end device profile information pertaining to end device 130. The information may categorize end device 130 as a stationary end device or a mobile end device, for example. AMF 205 may obtain the subscription or profile information from a UDM (not illustrated) or a similar network function (e.g., UDR, EIR, etc.). As further illustrated, based on this determination, AMF 205 may generate and transmit a query 504 to NSSF 405. For example, when it is determined that end device 130 is a stationary device, a query 505 may include a current TAI of end device 130. NSSF 405 may receive and process query 505 according to an existing standard (e.g., 3GPP standard, ITU standard, etc.).

When it is determined that end device 130 is a mobile device, query 505 may include registration area information and a current TAI of end device 130. For example, the registration area information may include multiple TAIs. As illustrated, NSSF 405 may receive query 509. Based on the receipt, NSSF 405 may read and identify the presence of the registration area information in query 512.

Figure 5B:
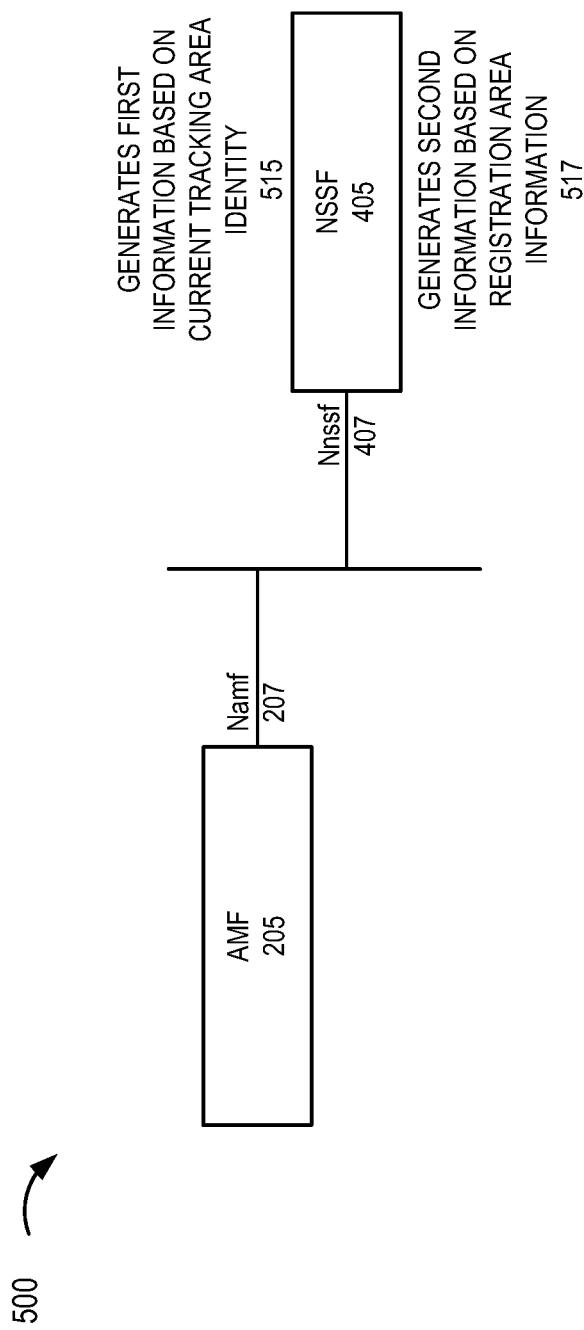

Referring to FIG. 5B, NSSF 405 may generate first information based on the TAI 515. For example, NSSF 405 may select a first set of allowed network slices for end device 130. NSSF 405 may select the network slices based on end device 130 requested and/or subscribed network slice selection assistance information (NSSAI) and the current TAI. NSSF 405 may select one or multiple first candidate AMFs that can serve the allowed network slices. The first information may also include the current TAI. For example, NSSF 405 may add a current TAI for both the allowed network slices and first candidate AMFs. Additionally, as further illustrated, NSSF 405 may generate second information based on the registration area information 517. For example, NSSF 405 may select a second set of allowed network slices for end device 130. NSSF 405 may select the network slices based on end device 130 requested and/or subscribed NSSAI and the registration area information. NSSF 405 may select one or multiple second candidate AMFs that can serve the allowed network slices. The second information may also include the registration area information. NSSF 405 may add the registration area information to both the second set of allowed network slices and the second candidate AMFs.

Figure 5C:
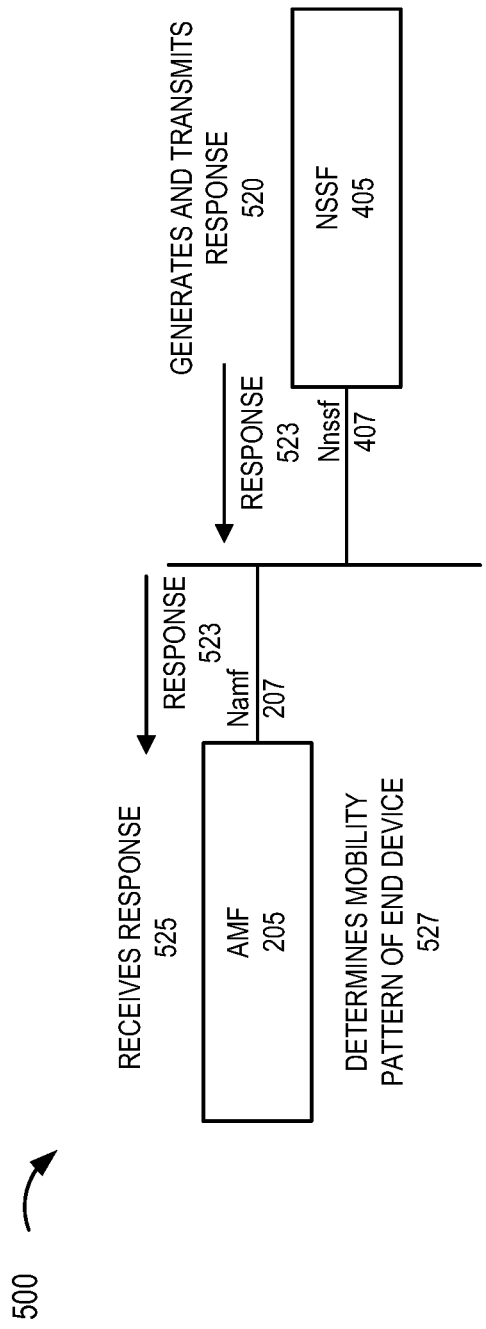

Referring to FIG. 5C, NSSF 405 may generate and transmit a response 520. A response 523 may include both the first information and the second information. AMF 205 may receive and may store the response 525. AMF 205 may determine a mobility pattern or a speed and direction 527 of end device 130 over a time period, for example. For example, although not illustrated, AMF 205 may query a location server (not illustrated) or an NWDAF. Based on this information, referring to FIG. 5D, AMF 205 may select the first information or the second information 530. For example, if the mobility pattern or mobility information (e.g., speed, direction, etc.) is relatively stationary (e.g., compared to a threshold value), AMF 205 may select the first information. Alternatively, if the mobility pattern or mobility information is relatively mobile (e.g., compared to a threshold value), AMF 205 may select the second information. AMF 205 may calculate a distance traveled over time or perform another type of analysis based location and/or mobility information associated with end device 130.

According to other exemplary embodiments, AMF 205 may determine mobility or stationary characteristics of end device 130 according to other procedures. For example, AMF 205 may query the location server or the NWDAF before query 505 is generated and transmitted, and again after response 523 is received. AMF 205 may compare the two instances of time/location information and determine whether end device 130 is relatively stationary or mobile during this time period. According to another example, AMF 205 may query the location server or the NWDAF before query 505 is generated and transmitted, and not perform a second query after response 523 is received. According to still another example, AMF 205 may not query the location server or the NWDAF, for example, and may be configured to use the second information. For example, the configuration may be a default setting.

Figure 5D:
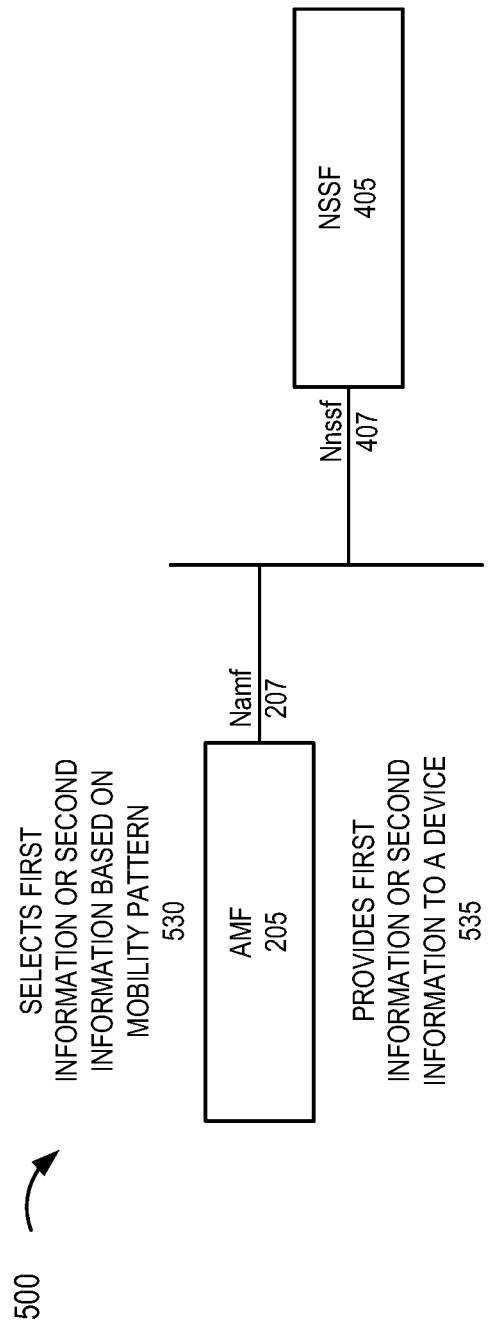

As further illustrated in FIG. 5D, AMF 205 may provide the first information or the second information to a device 535 based on the selection. For example, AMF 205 may transmit the allowed network slice information to end device 130 (not illustrated). Additionally, for example, AMF 205 may select from first or second candidate AMFs that can serve the allowed network slices during a redirect procedure.

FIG. 6 is a diagram illustrating exemplary components of a device 600 that may be included in one or more of the devices described herein. For example, device 600 may correspond to access device 107, external device 117, core device 122, end device 130, AMF 205, NEF 210, AF 215, NSSF 405, and/or other types of network devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to application service manager 119, software 620 may include an application that, when executed by processor 610, provides a function and/or a process of registration area-based application exposure and network slice selection service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service-based interface, or a reference interface, for example.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application layer network (e.g., external network 115) and/or another type of network (e.g., access network 105, core network 120, etc.). Thus, network devices described herein may be implemented as device 600.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
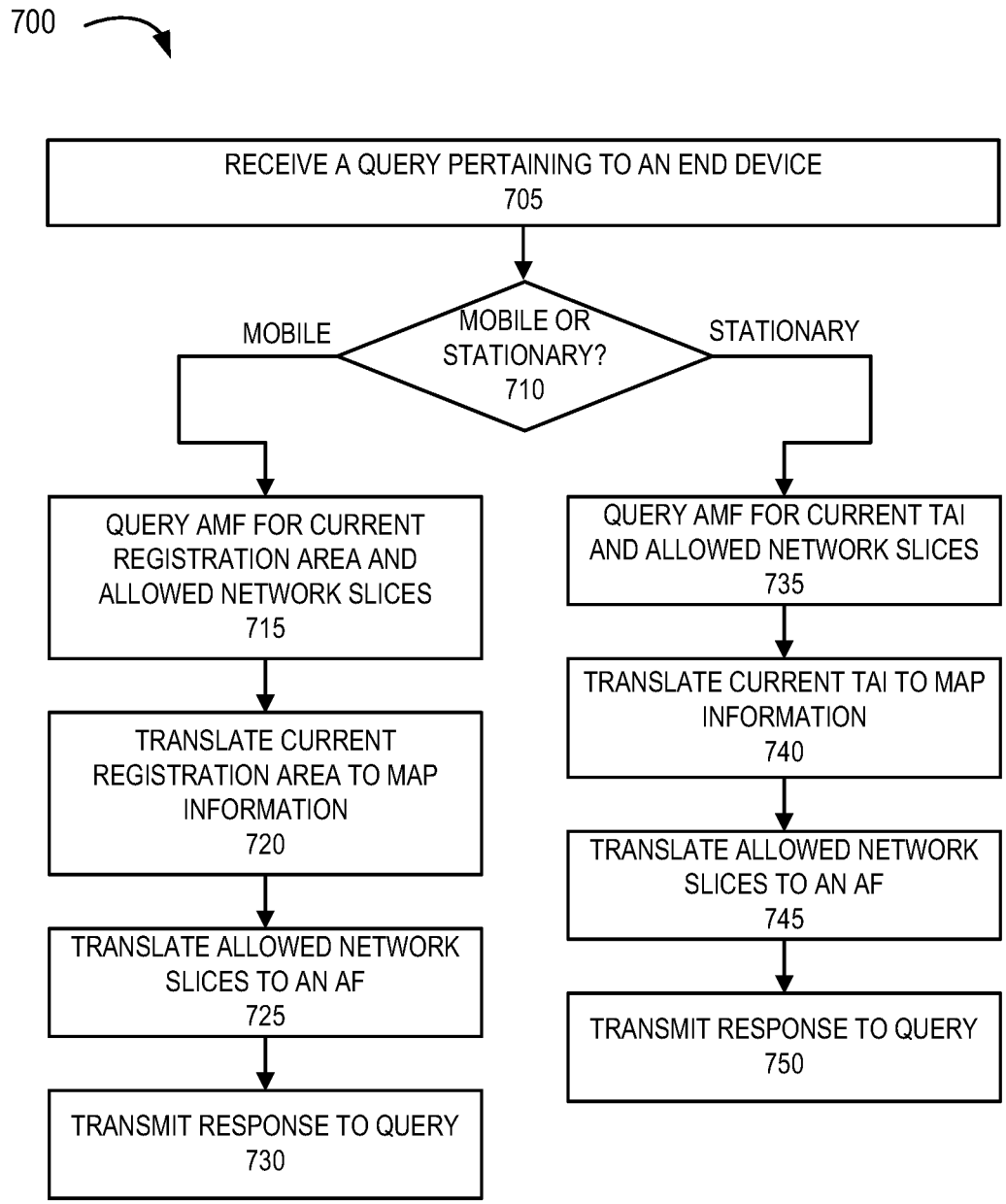
FIG. 7 is a flow diagram illustrating an exemplary process of an exemplary embodiment of a registration area-based application exposure and network slice selection service.

FIG. 7 is a flow diagram illustrating an exemplary process 700 of an exemplary embodiment of registration area-based application exposure and network slice selection service. According to an exemplary embodiment, NEF 210 may perform a step of process 700. According to an exemplary implementation, processor 610 executes software 620 to perform the step of process 700, as described herein. Alternatively, the step may be performed by execution of only hardware. Additionally, as described herein, an interface of NEF 210 may support a communication of information for the registration area-based application exposure and network slice selection service.

In block 705, NEF 210 may receive a query pertaining to end device 130. For example, NEF 210 may receive a query from AF 215 regarding end device's 130 current registration area information and allowed AFs.

In block 710, NEF 210 may determine whether end device 130 is a mobile end device or a stationary end device. For example, NEF 210 may make this determination based on end device profile information, subscription information, and/or other information pertaining to end device 130. NEF 210 may obtain information to make this determination from another network device, such as a UDM, a UDR, an EIR, or the like.

When it is determined that end device is mobile (block 710-mobile), NEF 210 may query AMF 205 for current registration area and allowed network slices (block 715). NEF 210 may receive, in response to the query, end device's 130 current registration area (e.g., a set or list of TAs) and allowed network slice information pertaining to end device 130.

In block 720, NEF 210 may translate the current registration area information to map information. For example, NEF 210 may translate multiple TAIs, which each may be constructed from a mobile country code (MCC), a mobile network code (MNC), and a tracking area code (TAC) of the TA, to geographic map or area representation information, such as one or multiple streets, one or multiple city blocks, a zip code, a city, a town, a county, a street address, a neighborhood, a landmark, a district, and/or another type of geographic region that may represent a current registration area for end device 130.

In block 725, NEF 210 may translate the allowed network slices to allowed AFs. For example, NEF 210 may translate a single-network slice selection assistance information (S-NSSAI), which may uniquely identify a network slice, to an allowed AF 215 (e.g., a network address and/or a network identifier of AF 215). In block 730, NEF 210 may transmit a response to the query to AF 215. For example, the response may include the map information and the allowed AFs.

When it is determined that end device is stationary (block 710-stationary), NEF 210 may query AMF 205 for current TAI and allowed network slices (block 735). NEF 210 may receive, in response to the query, end device's 130 current TAI (e.g., a single TA) and allowed network slice information pertaining to end device 130.

In block 740, NEF 210 may translate the current TAI to map information. For example, NEF 210 may translate a TA, which may be constructed from an MCC, an MNC, and a TAC of the TA, to geographic map or area representation information, such as one or multiple streets, one or multiple city blocks, a zip code, a city, a town, a county, a street address, a neighborhood, a landmark, a district, and/or another type of geographic region that may represent a current registration area for end device 130.

In block 745, NEF 210 may translate the allowed network slices to allowed AFs. For example, NEF 210 may translate an S-NSSAI, which may uniquely identify a network slice, to an allowed AF 215 (e.g., a network address and/or a network identifier of AF 215). In block 750, NEF 210 may transmit a response to the query to AF 215. For example, the response may include the map information and the allowed AFs.

FIG. 7 illustrates an exemplary embodiment of a process of registration area-based application exposure and network slice selection service, according to other exemplary embodiments, the registration area-based application exposure and network slice selection service may perform additional operations, fewer operations, and/or different operations than those illustrated and described.

Figure 8:
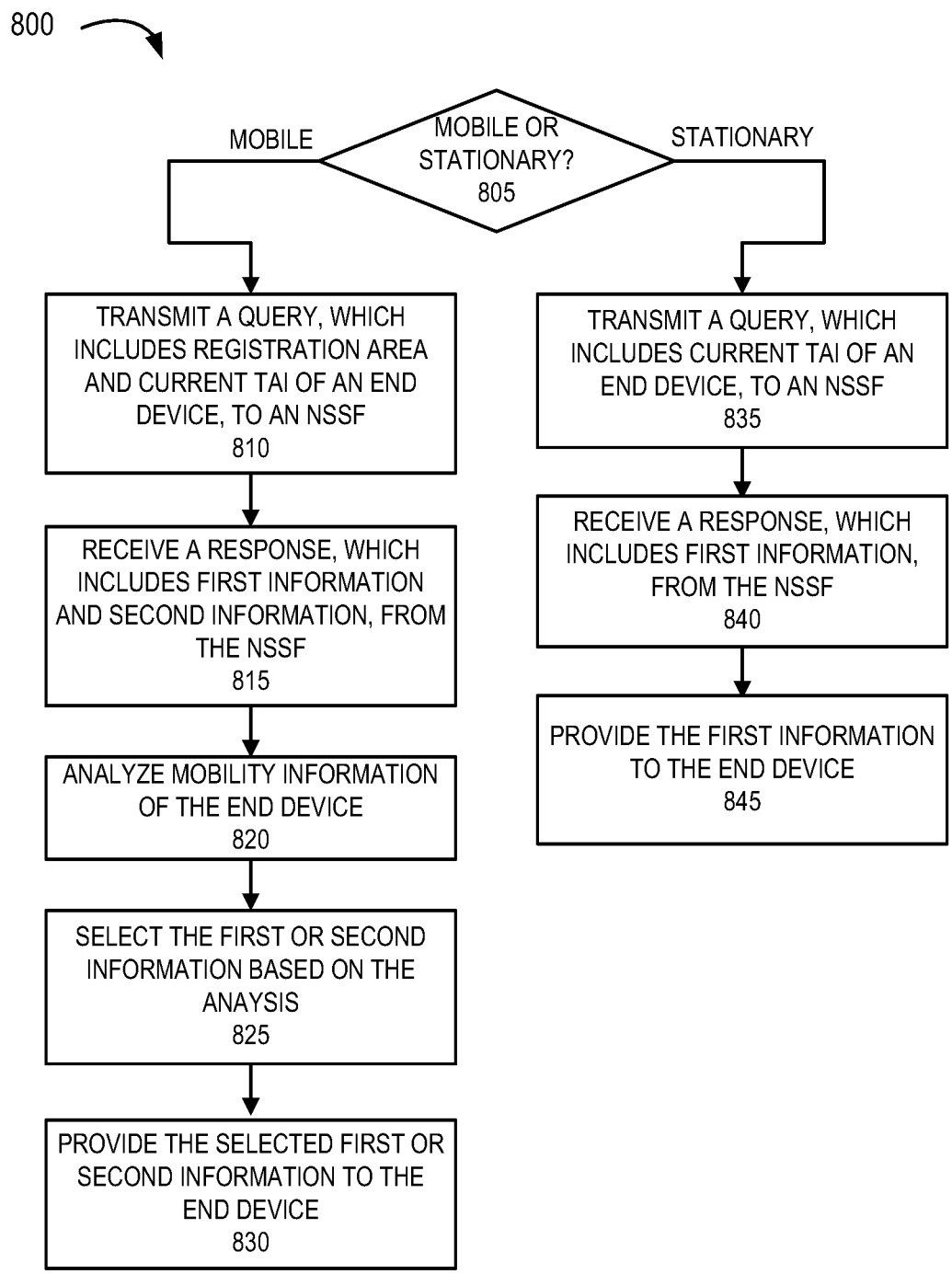
FIG. 8 is a flow diagram illustrating another exemplary process of an exemplary embodiment of a registration area-based application exposure and network slice selection service.

FIG. 8 is a flow diagram illustrating an exemplary process 800 of an exemplary embodiment of registration area-based application exposure and network slice selection service. According to an exemplary embodiment, AMF 205 may perform a step of process 800. According to an exemplary implementation, processor 610 executes software 620 to perform the step of process 800, as described herein. Alternatively, the step may be performed by execution of only hardware. Additionally, as described herein, an interface of AMF 205 may support a communication of information for the registration area-based application exposure and network slice selection service. Process 800 may be performed as a part of a registration procedure or another type of network procedure.

In block 805, AMF 205 may determine whether end device is a mobile end device or a stationary end device. For example, AMF 205 may make this determination based on subscription information and/or end device profile information pertaining to end device 130.

In block 810, when it is determined that end device is a mobile device (block 810), AMF 205 may transmit a query, which may include registration area information and a current TAI of end device 130, to NSSF 405. The registration area information may include multiple TAIs.

In block 815, AMF 205 may receive a response (to the query), which may include first information and second information, from NSSF 405, as described herein. In block 820, AMF 205 may analyze mobility information of end device, as described herein. In block 825, AMF 205 may select the first information or the second information based on the analysis, as described herein. In block 830, AMF 205 may provide the selected first information or the selected second information to end device 830, as described herein. For example, AMF 205 may transmit the allowed network slice information to end device 130. AMF 205 may store the allowed network slice information and the current TAI and/or registration area information.

FIG. 8 illustrates an exemplary embodiment of a process of registration area-based application exposure and network slice selection service, however according to other exemplary embodiments, the registration area-based application exposure and network slice selection service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 7 and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    determining, by a network device of a core network based on a query to a subscription_storage device, whether an end device is a mobile end device or a stationary end device, wherein the network device includes an access and mobility management function (AMF);
    in response to determining, by the network device, that the end device is a mobile end device, transmitting a first query, which includes a current tracking area and a current registration area of the end device, to another network device;
    receiving, by the network device based on the transmitted first query, first information that includes a first set of allowed network slices associated with the current tracking area and second information that includes a second set of allowed network slices associated with the current registration area that includes multiple tracking areas including the current tracking area;
    analyzing, by the network device, location information pertaining to the end device based on a threshold value;
    selecting, by the network device based on the analyzing, the first information or the second information and transmitting the selected first or second information to the end device;
    in response to determining, by the network device, that the end device is a stationary end device, transmitting a second query, which includes the current tracking area, to the other network device;
    receiving, by the network device based on the transmitted second query, the first information; and
    transmitting the first information to the end device.

2. The method of claim 1, wherein the subscription storage device includes a unified data repository.

3. The method of claim 2, wherein the first information includes a first set of candidate AMFs and the second information includes a second set of candidate AMFs.

4. The method of claim 1, further comprising:
    receiving, by the network device, one or multiple instances of the location information pertaining to the end device.

5. The method of claim 1, further comprising:
    analyzing, by the network device, profile information of the end device that includes information indicating whether the end device is the mobile end device or the stationary end device.

6. The method of claim 1, further comprising:
    calculating, by the network device, a distance traveled over time pertaining to the end device.

7. The method of claim 1, further comprising:
    determining, by the network device based on the analyzing, whether a mobility of the end device is stationary or mobile, and wherein the selecting further comprises:
    selecting, by the network device, the first information when it is determined that the mobility of the end device is stationary; and
    selecting, by the network device, the second information when it is determined that the mobility of the end device is mobile.

8. The method of claim 1, wherein the network device includes a Namf interface or an N22 interface.

9. A network device comprising:
    a processor configured to:
    determine, based on a query to a subscription storage device, whether an end device is a mobile end device or a stationary end device, wherein the network device is of a core network, wherein the network device includes an access and mobility management function (AMF);
    in response to a determination that the end device is a mobile end device, transmit a first query, which includes a current tracking area and a current registration area of the end device to another network device;
    receive, based on the transmitted first query, first information that includes a first set of allowed network slices associated with the current tracking area and second information that includes a second set of allowed network slices associated with the current registration area that includes multiple tracking areas including the current tracking area;
    analyze location information pertaining to the end device based on a threshold value; and
    select, based on the analysis, the first information or the second information, and transmit the selected first or second information to the end device;
    in response to a determination that the end device is a stationary end device, transmit a second query, which includes the current tracking area, to the other network device;
    receive, based on the transmitted second query, the first information; and
    transmit the first information to the end device.

10. The network device of claim 9, wherein the subscription storage device includes a unified data repository.

11. The network device of claim 10, wherein the first information includes a first set of candidate AMFs and the second information includes a second set of candidate AMFs.

12. The network device of claim 9, wherein the processor is further configured to:
    receive one or multiple instances of the location information pertaining to the end device.

13. The network device of claim 9, wherein the processor is further configured to:
    analyze profile information of the end device that includes information indicating whether the end device is the mobile end device or the stationary end device.

14. The network device of claim 9, wherein the processor is further configured to:
    calculate a distance traveled over time pertaining to the end device.

15. The network device of claim 9, wherein the processor is further configured to:
    determine, based on the analysis, whether a mobility of the end device is stationary or mobile, and wherein when selecting, the processor is further configured to:

select the first information when it is determined that the mobility of the end device is stationary; and select the second information when it is determined that the mobility of the end device is mobile.

16. The network device of claim 9, wherein the network device includes a Namf interface or an N22 interface.

17. A non-transitory computer-readable storage medium storing instructions executable by a processor of a network device that includes an access and mobility management function (AMF) of a core network, which when executed cause the processor to:

determine, based on a query to a subscription storage device, whether an end device is a mobile end device or a stationary end device;

in response to a determination that the end device is a mobile end device, transmit a first query, which includes a current tracking area and a current registration area of the end device to another network device;

receive, based on the transmitted first query, first information that includes a first set of allowed network slices associated with the current tracking area and second information that includes a second set of allowed network slices associated with the current registration area that includes multiple tracking areas including the current tracking area;

analyze location information pertaining to the end device based on a threshold value; and select, based on the analysis, the first information or the second information, and transmit the selected first or second information to the end device;

in response to a determination that the end device is a stationary end device, transmit a second query, which includes the current tracking area, to the other network device;

receive, based on the transmitted second query, the first information; and transmit the first information to the end device.

18. The non-transitory computer-readable storage medium of claim 17, wherein the instructions comprise further instructions, which when executed, cause the processor to:

determine, based on the analysis, whether a mobility of the end device is stationary or mobile, and wherein when selecting, the processor is further configured to:

select the first information when it is determined that the mobility of the end device is stationary; and select the second information when it is determined that the mobility of the end device is mobile.

19. The non-transitory computer-readable storage medium of claim 17, wherein the network device includes a Namf interface or an N22 interface.

20. The non-transitory computer-readable storage medium of claim 17, wherein the subscription storage device includes a unified data repository.

* * * * *